United States Patent

Schmidt

[11] Patent Number: 5,948,448
[45] Date of Patent: Sep. 7, 1999

[54] APPARATUS FOR CONTROLLING PLASTIC MELT FLOW IN INJECTION MOLDING MACHINES

[75] Inventor: Harald Schmidt, Georgetown, Canada

[73] Assignee: Eurotool, Inc., Canada

[21] Appl. No.: 08/972,277

[22] Filed: Nov. 18, 1997

[51] Int. Cl.[6] .................................................. B29C 45/23
[52] U.S. Cl. ...................................... 425/192 R; 425/564
[58] Field of Search ............................... 425/190, 192 R, 425/564–566

[56] References Cited

U.S. PATENT DOCUMENTS

| | | | |
|---|---|---|---|
| 4,468,191 | 8/1984 | Gellert | 425/564 |
| 4,702,689 | 10/1987 | Schmidt et al. | 425/564 |
| 4,705,473 | 11/1987 | Schmidt | 425/564 |
| 4,747,770 | 5/1988 | Schmidt | 425/564 |
| 4,793,795 | 12/1988 | Schmidt et al. | 425/564 |
| 4,808,103 | 2/1989 | Hehl | 425/564 |
| 4,886,439 | 12/1989 | Hehl | 425/564 |
| 5,182,118 | 1/1993 | Hehl | 425/564 |
| 5,518,393 | 5/1996 | Gessner | 425/564 |
| 5,660,369 | 8/1997 | Gauler | 251/63.5 |

Primary Examiner—James P. Mackey

[57] ABSTRACT

An apparatus for controlling plastic melt flow in an injection molding machine comprising: a thermally conductive housing having a fluid flow channel sealably disposed in the housing, the channel having an input end sealably connected to a source of flow of a plastic melt material and an output end for controllably delivering the flow of plastic material to an input aperture of a mold cavity; an elongated pin disposed within at least a portion of the channel for controlling output of the flow of plastic melt through the output end of the channel, the pin having a head end and a pin end and a length extending between the head end and the pin end; the pin being slidably mounted along its length through an aperture in the housing such that the pin is slidably movable through the aperture between at least one unrestricted flow position and at least one restricted flow position; the head end of the pin extending outside the housing and being readily connectable to and disconnectable from a pin reciprocating mechanism, the pin reciprocating mechanism being controllably operable to move the pin between an unrestricted flow position and a restricted flow position.

4 Claims, 7 Drawing Sheets

APPARATUS FOR CONTROLLING PLASTIC MELT FLOW IN INJECTION MOLDING MACHINES

BACKGROUND OF THE INVENTION

The present invention relates to injection molding machines and, in particular, to apparati for controlling the flow of a plastic melt material through a hot runner which carries the plastic melt through a series of channels to an output aperture which is aligned with an input aperture of the cavity of a mold.

SUMMARY OF THE INVENTION

In injection molding processes, when plastic material is introduced into an injection molding machine, it is first melted and then injected under very high pressure through one or more enclosed channels of a carrier system (which may be a hot runner) which carry the flow of the pressurized molten plastic to the end(s) of the one or more channels where the plastic melt exits the channel(s) and is injected into the cavity of a mold.

In normal operation of such machines, it is necessary to provide a mechanism for stopping or starting or otherwise controlling the rate of flow through the channels of the hot runner. A conventional hot runner typically comprises a solid housing comprised of a typically thermally conductive metal material such as steel or potentially aluminum or copper and includes heat pipes, electrical coils or other heating elements disposed within, around and/or throughout the body of the hot runner housing for purposes of regulating the temperature of the housing, particularly so that the housing temperature can be maintained at an elevated temperature at or above the melt temperature of the plastic material input into the machine. Depending on the plastic material, elevated temperatures ranging from 300° to 750° F. may be employed in order to maintain the plastic in molten form. The fluid flow channels typically comprise bores or channels formed (e.g. drilled) within the body of the housing or alternatively thermally conductive pipes or tubes seated within the housing in intimate contact with the thermally conductive, heated housing.

In order to regulate the flow of plastic, a valve pin is disposed within and through the interior length of the portion of a channel which immediately precedes the output or exit end of a channel. The valve pin, a relatively thin, elongated metal rod, has a head end which extends through the wall of the housing to its exterior and is connected to an actuating mechanism mounted on the outside surface of the housing. The head end of the pin is connected to an actuating mechanism also mounted on or to the exterior of the housing, the actuating mechanism causing the pin to reciprocate back and forth within the output/exit portion of the channel between one or more flow restricted and unrestricted flow positions. The tip end of the pin, the pin end, has an outer surface contour which is preferably complementary to the contour of the inner surface of the output end of a flow channel. Typically, the output end of a channel terminates in a nozzle which is sealably connected (at a back end of the nozzle) to the end portion of the channel bore, the nozzle having a central bore or passage aligned with the bore or passage of the flow channel at the exit end of the channel. For purposes of discussion herein, the bore of a nozzle is considered as a portion of the overall bore or passage of a flow channel as the term channel or flow channel is used herein.

The pin actuating mechanism typically comprises a piston slidably mounted within a complementary bore of a cylinder housing wherein the piston is controllably slidable back and forth along a predetermined distance of linear travel within the bore of the cylinder housing. The length of back and forth movement of the piston may be controlled in a variety of conventional ways such as via hydraulic or pneumatic means wherein the bore of the cylinder is fluid sealed, the piston is sealably seated around its periphery on the interior wall surface of the cylinder bore, and a gas or liquid is controllably input and/or withdrawn from sealed spaces within the sealed cylinder bore on opposing surfaces of the piston so as to cause the piston to move back and forth within the cylinder bore by virtue of a pressure differential exerted on opposing surfaces of the piston by the fluid being input into or withdrawn from the sealed spaces on opposing surfaces of the piston. Alternatively, the movement of the piston may be controlled by conventional electromechanical means such as via a motor driven rod or lever which is mechanically interconnected to the piston to push and or pull on the piston in a reciprocating fashion. Thus, the piston is controllably reciprocable between predetermined back and forth positions along a predetermined path, distance or length of travel.

As mentioned above, the elongated pin is slidably mounted in a complementary aperture extending through the wall of the housing of the hot runner such that the head end of the valve extends to the exterior of the housing so that the head end of the pin may be connected to the piston. The pin is typically sealably mounted in its mounting aperture such that plastic melt material flowing through the channel and corrosive gases which form within the molten plastic is largely prevented from seeping through the pin mounting aperture to the exterior of the hot runner housing. Although a variety of mechanisms have been developed to prevent molten plastic and gases present within the flow channel from seeping through the pin mounting aperture, such seepage inevitably occurs over the course of time and usage of the hot runner system.

Conventional mechanisms for connecting a valve pin to an actuator piston typically mount or connect the head of the pin to the piston such that the head of the pin is either disposed within the sealed cylinder housing in which the piston is disposed and/or such that access to the head of the pin may only be attained by disassembly of the cylinder housing itself exposing the sealed bore and the piston such that the head of the pin is exposed for removal and replacement with a new pin in the event of pin breakage. Examples of such prior art systems are shown in U.S. Pat. Nos. 5,660,369 and 5,518,393. Conventional valve pin mounting systems also typically have a bore extending through the entire length of the actuator piston or at least so far through the piston as to extend into the interior of the sealed space in the housing in which the piston is mounted. Such bores extending through the actuator piston provide a passage for potential seepage of molten plastic or gases emanating from the flow of plastic in the channel of the hot runner into the interior of the bore of the actuator which can damage various seals utilized within and around the piston and the actuator bore. Such actuators are not generally available from commercial vendors and must be custom made by the hot runner manufacturer for their peculiar use in conjunction with the hot runner manufacturer's equipment.

In accordance with the present invention therefore, there is provided an apparatus for controlling plastic melt flow in an injection molding machine comprising: a thermally conductive housing having a fluid flow channel sealably disposed in the housing, the channel having an input end sealably connected to a source of flow of a plastic melt material and an output end for controllably delivering the flow of plastic material to an input aperture of a mold cavity; an elongated pin disposed within at least a portion of the channel for controlling output of the flow of plastic melt through the output end of the channel, the pin having a head end and a pin end and a length extending between the head end and the pin end; the pin being slidably mounted along its length through an aperture in the housing such that the pin is slidably movable through the aperture between at least one unrestricted flow position and at least one restricted flow position; the head end of the pin extending outside the housing and being readily detachably connected or interconnected to a pin reciprocating mechanism, the pin reciprocating mechanism being controllably operable to move the pin between an unrestricted flow position and a restricted flow position.

Preferably, the pin reciprocating mechanism has a slot for slidably receiving and retaining the head end within the slot, the pin reciprocating mechanism being readily detachably mounted on an outside surface of the housing such that the head end is readily slidable into and out of the slot upon detachment of the pin reciprocating mechanism from the housing.

The pin reciprocating mechanism typically comprises a piston mounted within a fluid sealed bore, the piston being controllably movable between a first and a second position within the sealed bore, the piston having or being interconnected to a pin mount having a slot for slidably receiving and retaining the pin head. The pin reciprocating mechanism is preferably readily detachably mounted on the outside of the housing such that the pin head is readily slidable into and out of the slot upon detachment.

The piston may have a stem portion extending outside the sealed bore, or be interconnected to a pin mount disposed outside the sealed bore, wherein the stem portion or the pin mount has a mechanism for readily attaching to and detaching from the pin head.

The pin end of the pin typically has an outside surface having a selected contour (for example, straight cylindrical, tapered, curved, pointed, elliptical, etc.) and the output end of the channel has an inner receiving surface which is complementary to the selected contour of the outside surface of the pin end, the outside surface of the pin end mating with the inner receiving surface of the output end of the channel in at least one fluid flow restriction position of the pin such that the flow of plastic melt material through the output end is prevented.

BRIEF DESCRIPTION OF THE DRAWINGS

The accompanying drawings depict examples of embodiments of the present invention and other explanatory information wherein.

DETAILED DESCRIPTION OF THE INVENTION

The following description makes reference to exemplary embodiments of the invention as shown in the figures.

Figure 1:
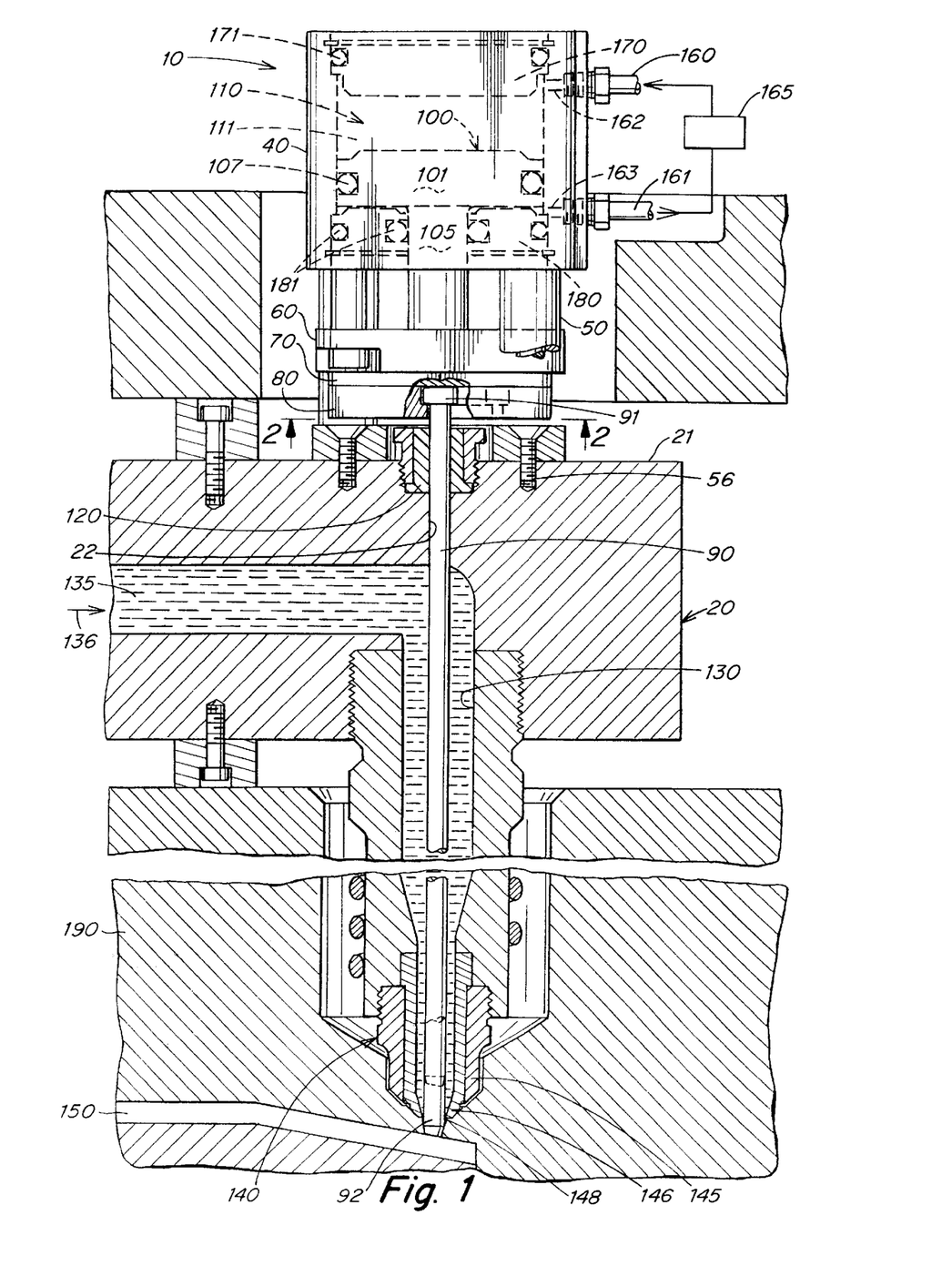
FIG. 1 is a side cross-sectional view of an embodiment of the invention where an actuator having a pin is interconnected to a piston and shows the actuator mounted on the exterior of a hot runner housing with the head of the valve flow control pin mounted on or to a mounting assembly which is interconnected to the piston of the actuator. The valve flow control pin shown in FIG. 1 is reciprocable throughout a portion of the interior of a hot runner plastic melt flow channel at the exit end of the channel, FIG. 1 also showing the piston and valve pin in an extended, channel flow restriction position.
Figure 2:
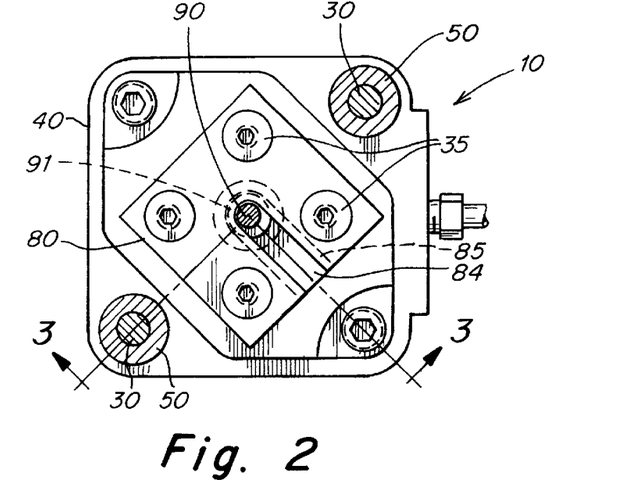
FIG. 2 is a top cross-sectional view along lines 2—2 of the FIG. 1 actuator and pin mounting assembly components showing the relative locations of a slot for receiving the head of the pin and various bolt connections between components of the FIG. 1 apparatus.
Figure 3:
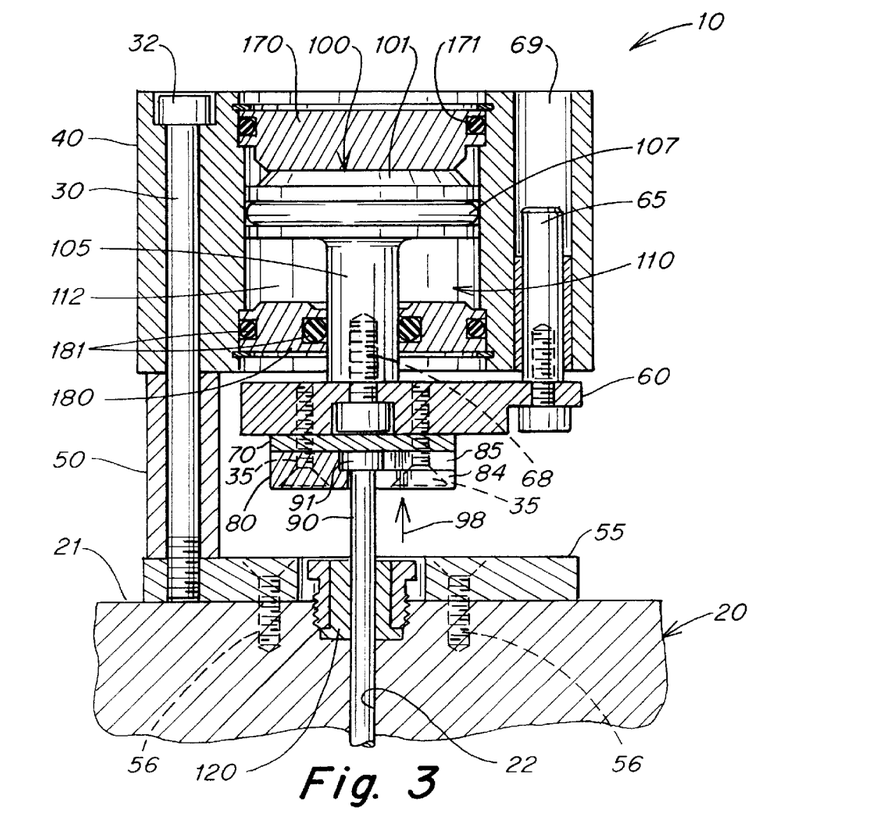
FIG. 3 is a more detailed side cross-sectional view above lines 3—3 (shown in FIG. 2) showing the FIG. 1 piston, valve pin and associated pin mounting assembly components in a retracted, channel flow unrestricted position.
Figure 4:
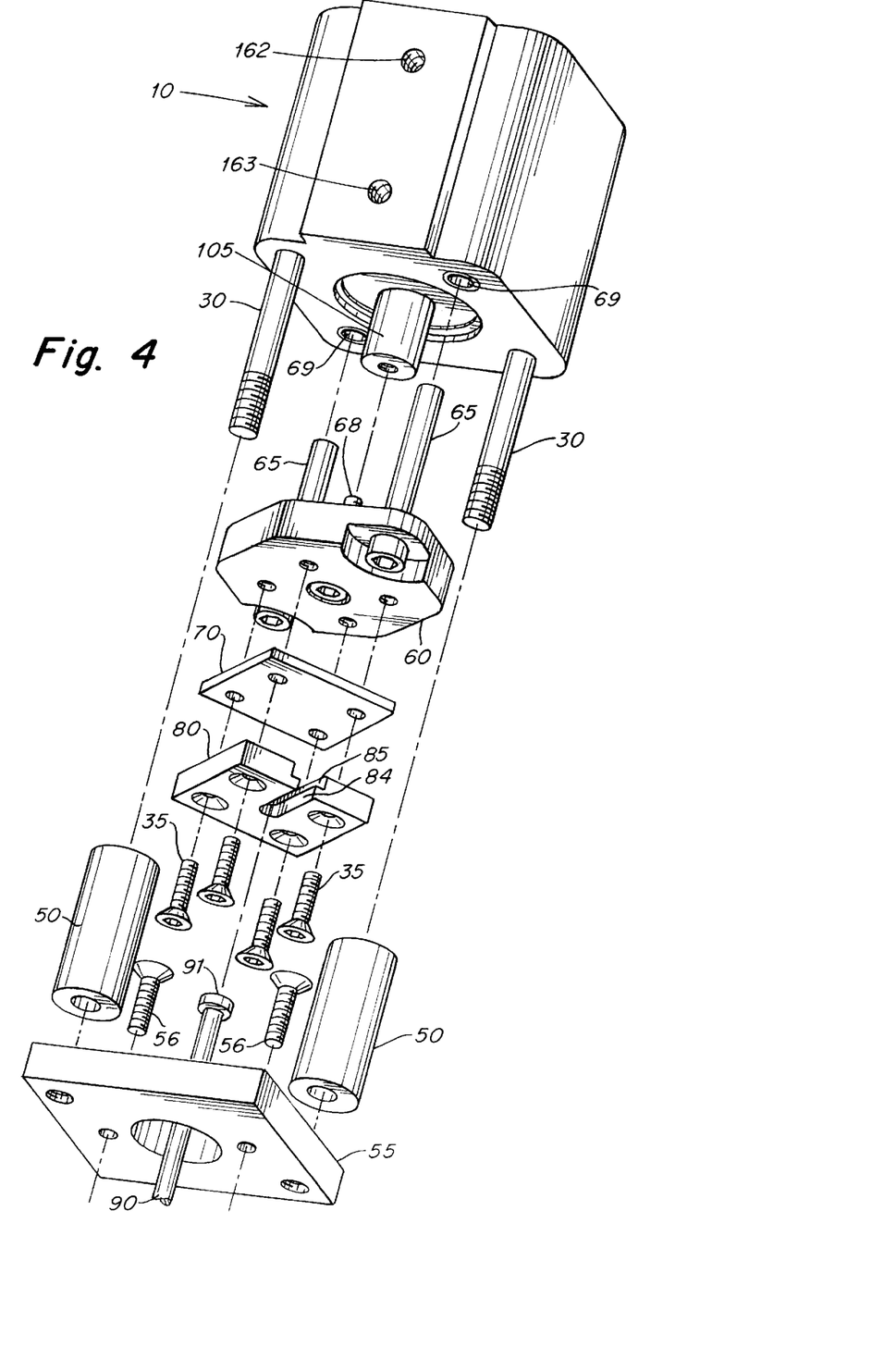
FIG. 4 is an isometric exploded view of the actuator, pin and pin mounting assembly components of the FIG. 1 apparatus.

FIG. 1 shows an apparatus according to the invention showing a value pin actuator 10 being readily detachably mounted on an outside surface of a hot runner manifold 20 via a pair of bolts 30, FIGS. 3, 4, which extend through the body of the actuator housing 40, a stand-off sleeve 50 a mounting plate 55 into the manifold 20 as shown best in FIGS. 3, 4. The head ends 35 of the mounting bolts 30 are readily accessible from the top of the actuator 10 as shown in FIG. 3 such that the bolts may be readily screwed and unscrewed by the user to readily attach and detach the actuator to end 10 from the manifold at will.

In the embodiment shown in FIGS. 1–4, an intermediate assembly of pin mounting components 60, 70, 80 are provided for purposes of interconnecting the head 91 of a valve pin 90 to some portion (such as stem 105) of the piston 100 of the actuator 10 which is disposed or extends outside the fluid sealed bore 110 within which the piston 100 is slidably mounted. In the embodiment shown in FIGS. 6, 7, the head 391 of the valve pin 390 is connected directly to an integral stem portion 305 of the piston 300.

As shown in FIG. 1, the valve pin 90 is slidably mounted in the central aperture of a valve seal bushing 120 which is screwably fixed within a complementary bore provided in the top surface 21 of the manifold. The pin 90 further extends through a complementary bore 22 drilled through the body of the manifold in a position and disposition such that the axis of the pin 90 is aligned along the axis of the distal length of a runner or channel 130 through which a flow of hot molten plastic 135 is being input under very high pressure in the direction 136.

The very distal end of the runner or flow channel 130 terminates in a nozzle having a two piece tip 140 having a central bore communicating with the passage of the runner 130. The tip end of nozzle 140 comprises an outer piece 145 and an inner piece 146, FIG. 1. At the tip end of the inner tip piece 146 of the nozzle 140, the central bore of the inner piece 146 of the nozzle 140 terminates in a small aperture which communicates with the part cavity 150 of a cooled mold 190. As shown in FIG. 1, the piston 100 of actuator 10 is in a downward flow restriction position wherein the tip or pin end 92 of valve pin 90 is closing off the aperture 148 at the tip end of nozzle 140 such that the injected plastic melt flow 135 is prevented from exiting the aperture at the tip end 148 of nozzle 140.

In FIG. 3, the piston 100 is shown in an upwardly 98 retracted or unrestricted flow position wherein the tip end 92 of the valve pin 90 is backwardly withdrawn out of the nozzle tip aperture 148 such that the melt 135 may flow 136 through the aperture 148 into mold cavity 150.

As shown in FIG. 1, the actuator 10 is provided with fluid (pneumatic or hydraulic) input/output ports 162, 163 which are sealably connected to fluid transport tubes 160, 161 which are in turn connected to a controllably pumped source of fluid 165 which inputs/outputs fluid to and from the sealed spaces above 111 and below 112 the upper and lower surfaces of the piston head 101 such that the piston 100 may be controllably moved in a reciprocating fashion between restricted flow, FIG. 1, and unrestricted flow, FIG. 3, positions. The actuator 10 comprises a cylinder housing 40 having a central bore 110 in which the piston head 101 is slidably mounted around its perimeter surface. As shown, the bore 110 is sealed off by a series of seals such as upper plug 170 and its associated O-ring seal 171 and lower plug 180 and its associated O-ring seals 181. An O-ring seal 107 around the perimeter of piston head 101 enables the fluid input/output to and from ports 162, 163 to remain within sealed chambers 111, 112 and thus create an effective pressure differential between the upper and lower surfaces of piston head 101 as desired via controlled fluid pumping source 165. As shown in FIGS. 1, 3 the upper 170 and lower 180 plugs act as stops against which the upper and lower surfaces of the piston head 101 engage thus defining two precise upper and lower (or back and forth) reciprocal positions by which the precise length of the pin 90 may be selected for purposes of closing off the tip end aperture 148 of the nozzle 140 with the tip or pin end 92 of the pin 90 by the mating of the outside surface of the pin end 92 with the inside surface of the nozzle aperture 148 which leads into cavity 150.

In the FIGS. 1–4 embodiment, the pin head 91 is laterally slidable into an upper slot or groove 85 formed within receiving plate 80 while the pin 90 is laterally slidable through a lower slot 84 which is narrower in width than the diameter of the pin head 91 such that the pin head 91 cannot axially fit through the lower slot 84. A retaining plate 70 and adapter plate 60 are affixed over slot 85 via bolts 35 such that the pin head 91, once slid laterally into slot 85, is axially retained in the slot 85. The pin head 91 can be slid into slot 85 when bolts 30 are unscrewed out of engagement with their complementary threaded apertures provided in mounting plate 55, FIG. 3, such that the actuator 10 and subassembly of plates 60, 70, 80 is movable by hand. Once the pin head 91 is slid into slot 85 and the assembly shown in FIG. 4 is bolted down as shown in FIGS. 1, 3, the pin head 91 is laterally and axially fixed or retained within slot 85. As mentioned above, the entire assembly of the actuator 10 and pin mount components 60, 70, 80 and their associated bolts 35, 68 and slide posts 65 are readily detachable via the unscrewing of bolts 30 only, which upon detachment, renders the sliding of the pin head 91 out of slot 85 immediately possible.

As shown in FIGS. 1, 3, 4 mounting plate 55 is fixedly attachable to the top surface 21 of manifold 20 via bolts 56. Receiving plate 80 is fixedly attachable to retaining plate 70 and adapter plate 60 via bolts 35. Adapter plate 60 is fixedly attachable to piston stem 105 via bolt 68 and adapter plate 60 is laterally fixed relative to housing 40, via slide posts 65 which are slidably receivable within complementary guide apertures 69, FIGS. 3, 4.

As the assembly just described shows, the pin head 91 is received and retained outside the area or volume of the interior of the sealed bore 110 and/or the piston 100. And, the pin 90 is readily replaceable (in the event of wear or breakage) by simply detaching the entire assembly 10, 60, 70, 80 via detachment of bolts 30.

Figure 5:
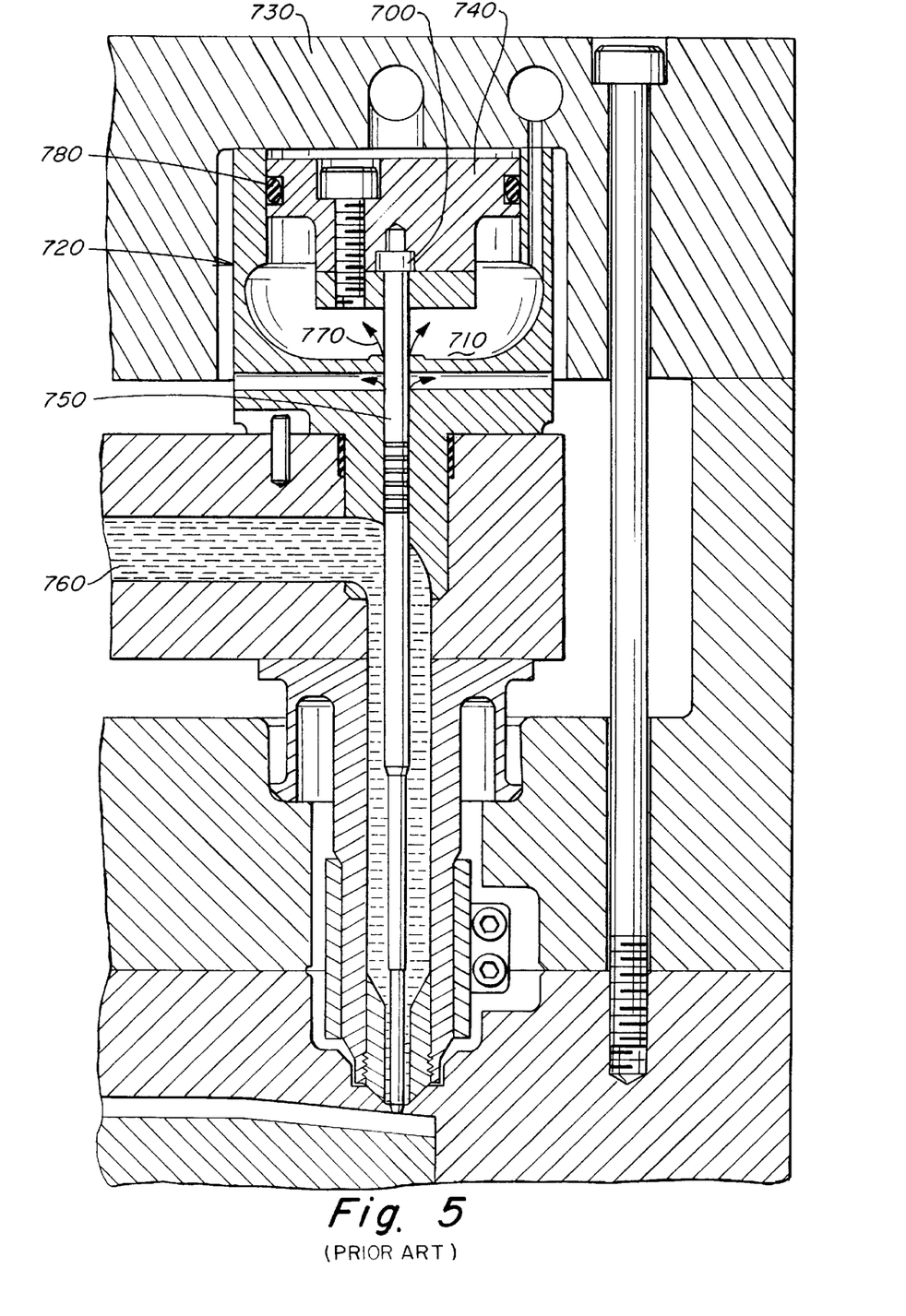
FIG. 5 is a side cross-sectional view of a conventional prior art actuator/flow control valve pin apparatus showing the pin extending entirely through the piston and the head of the pin mounted inside the bore or cylindrical well of the actuator.

Prior apparatuses and methods for mounting valve pins which control plastic melt flow required disassembly of the housing of the actuator itself in order to obtain access to the pin head. For example, as shown in the prior art example of FIG. 5, the pin head 700 is mounted within the interior of the sealed bore 710 of the actuator 720. In order to get access to the pin head 700, the top plate 730 of the housing of the actuator 720 must be disconnected and the piston 740 itself must be disassembled. The fact that the length of the pin 750 extends through the piston 740 and into or near the volume of the sealed bore 710 allows hot gases and/or molten plastic 770 emanating from the pressurized plastic melt flow 760 to possibly invade the interior of the sealed bore 710 and thus possibly degrade the various seals such as seal 780 which are necessary for maintaining the necessary operational pressure differentials within the chambers above and below the piston head 740.

Figure 6:
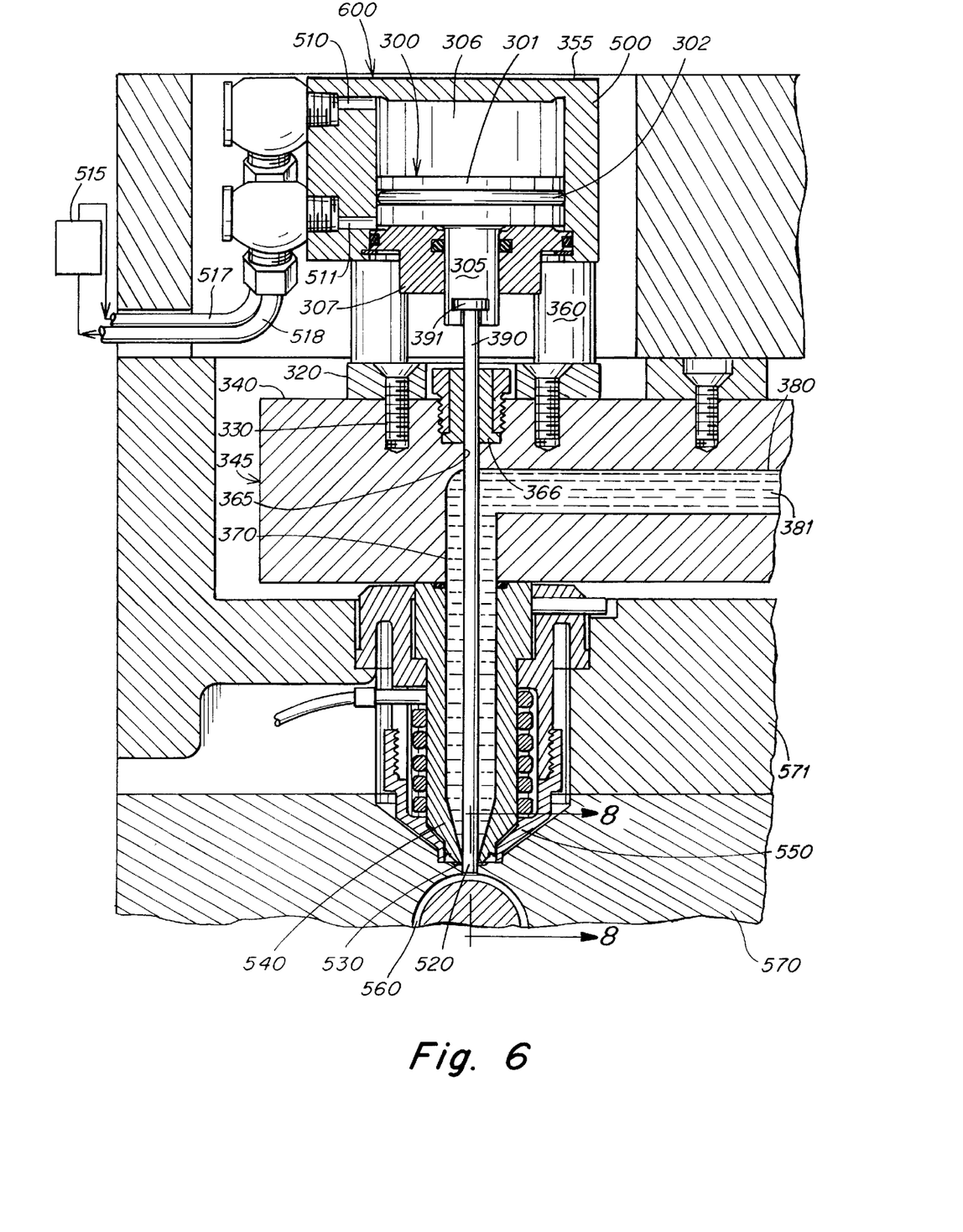
FIG. 6 is a side cross-sectional view of another embodiment of the invention showing the head of a value flow control pin being mounted directly on or to an extension of the piston component of the actuator.
Figure 7:
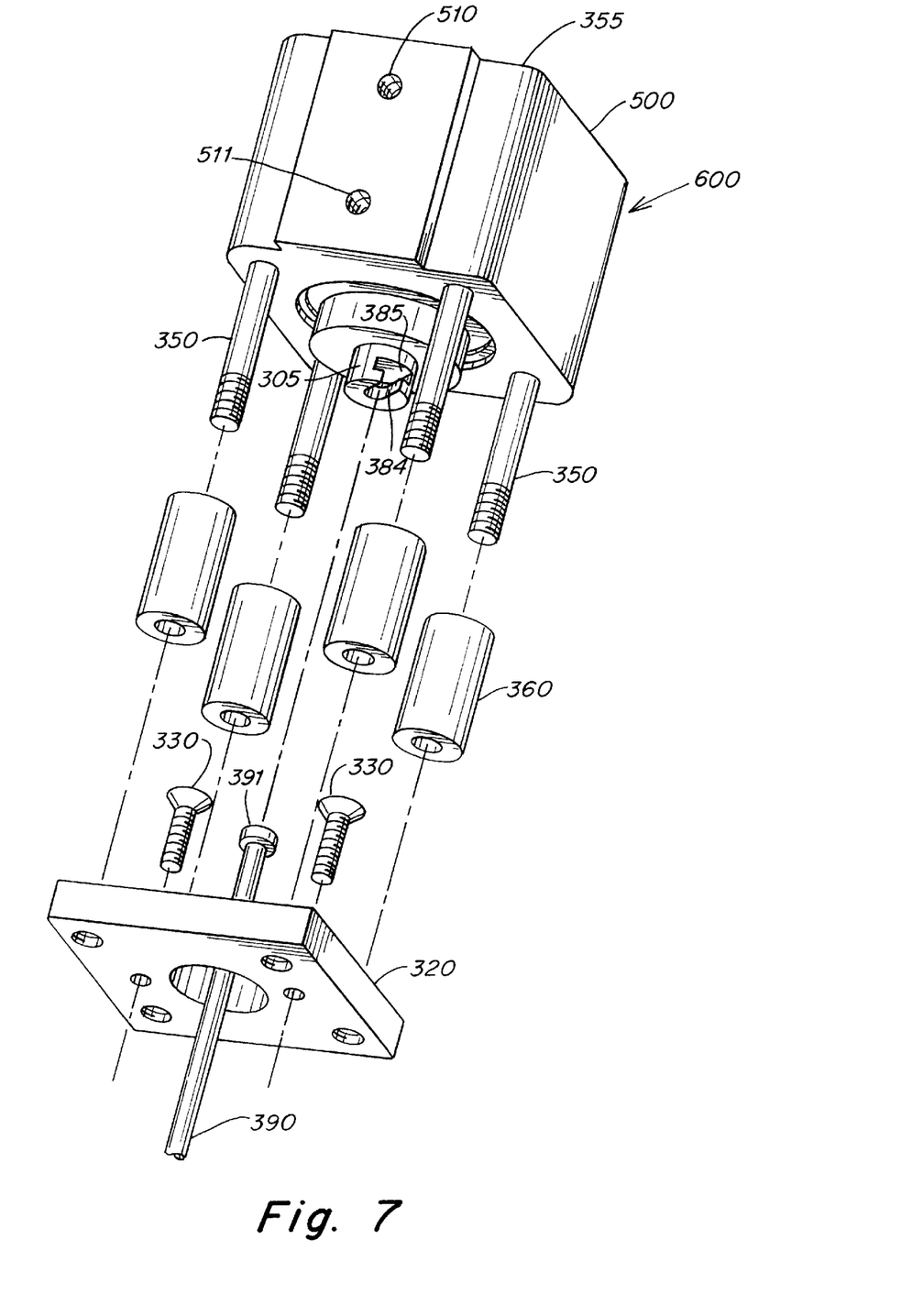
FIG. 7 is a perspective exploded view of the FIG. 6 apparatus.

FIGS. 6, 7 show another embodiment of the invention wherein the pin mounting mechanism is provided within an integral extension, the stem 305, of the piston 300. As shown, an actuator 600 comprising a housing 500, a piston 300 slidably disposed within a sealed bore 306, a plug 307 and fluid inlet/outlet ports 510, 511 is mounted on a mounting plate 320 which is, in turn, attached via bolts 330 to the top surface 340 of the manifold 345 which contains the hot runner of an injection molding machine. The actuator housing 500 is readily attachable to and detachable from the mounting plate 320 via bolts 350, the heads of which (not shown) are readily accessible from the top 355 of the actuator housing 500 for manual screwing and unscrewing of the bolts 350.

As shown in FIG. 7, the distal end of the piston stem 305 has a pin head slot receiving and retaining mechanism 384, 385 machined into the stem 305 itself The head 391 of valve pin 390 is laterally slidable into complementary slot 385 and the pin 390 is simultaneously laterally slidable into slot 384 when the actuator 600 is in its detached state as shown in FIG. 7. Once the pin head 391 is inserted within slot 385, the pin head 391 is axially fixed within the slot 385 and when the actuator 600 is fully attached to the mounting plate 320 via bolts 350 as shown in FIG. 6, the pin head 391 is both laterally and axially fixed in position for stable reciprocal up and down movement together with reciprocal up and down movement of the piston 300 within sealed bore 306.

Figure 8:
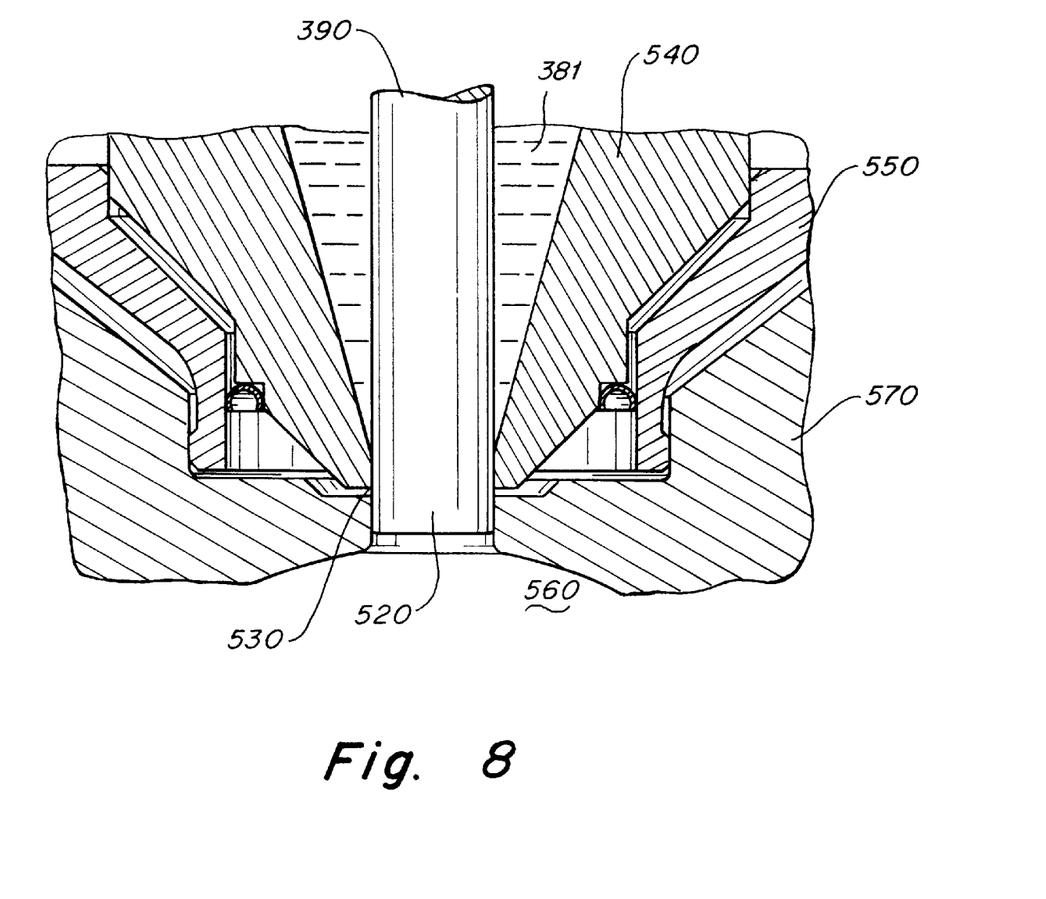
FIG. 8 is a side cross-sectional close-up view of the tip end of the plastic flow channel shown in FIG. 6, showing the details of the disposition of the tip end of the pin within the tip of the exit end of the flow channel, the pin essentially closing or sealing off the tip of the exit end of the flow channel such that plastic flow is stopped/restricted from exiting the channel.

As shown in FIG. 6, the actuator housing 500 is mounted a selected distance above plate 320 via spacers 360. The pin 390 extends through and is slidably mounted in a valve seal bushing 366 and a bore 365 in the manifold such that the axis of the pin 390 is aligned with the axis of the output distal length 370 of the runner or channel 380. In the same manner, as in the above described FIG. 1–4 embodiment, the pin 390 is movable axially between a restricted flow position (as shown in FIGS. 6,8) and an unrestricted flow position (not shown) where the tip or pin end 520 of the pin 390 is displaced upwardly out of insertion within the output aperture 530 of the inner nozzle piece 540 which exits into the part cavity 560 of mold 570, 571. Reciprocal movement of pin 390 is controllably effected via pumped fluid source 515 which is sealably connected to inlet/outlet ports 510, 511 via lines 517, 518 so as to enable piston 300 to be reciprocated between up and down, unrestricted flow and restricted flow positions within sealed bore 306 in the same manner as described above whereby pressure differentials are controllably created in fluid sealed chambers above and below piston head 301 via sealable engagement of O-ring seal 302 with the interior wall surface of bore 306.

As shown in FIG. 8, the tip end 520 of pin 390 is in a position wherein the output aperture 530 of nozzle 540, 550 is completely closed off via the mating of the outside surface of tip 520 with the inside surface of inner nozzle piece 540 such that the injected plastic melt flow 381 through aperture 530 is prevented.

As shown in FIGS. 6, 7, the connection or interconnection of pin head 391 to stem 305 via the distally disposed receiving and retaining slots 384, 385 enables the user to obtain ready access to slots 384, 385 and to readily remove or insert a pin head into and out of slots 384, 385 without having to disassemble the actuator housing 500 or otherwise obtain access to or expose the bore 306. In addition, slots 384, 385 do not extend and/or are not disposed at any time within the volume or area of the sealed bore 306 during reciprocation of piston 300 within bore 306 such that hot gases or molten plastic which may emanate through valve bushing 366 during operation of the injection molding machine or hot runner 380 will not be able to invade the interior of bore 306 as a result of the pin head 391 connection to the piston 300.

It will be understood that various modifications may be made to the embodiments disclosed herein. Therefore, the above description should not be construed as limiting, but merely as exemplifications of preferred embodiments. Those skilled in the art will envision other modifications within the scope spirit of the invention.

What is claimed is:

1. Apparatus for controlling plastic melt flow in an injection molding machine comprising:

a thermally conductive housing having a fluid flow channel sealably disposed in the housing, the channel having an input end sealably connected to a source of flow of a plastic melt material and an output end for controllably delivering the flow of plastic material to an input aperture of a mold cavity;

an elongated pin disposed within at least a portion of the channel for controlling output of the flow of plastic melt through the output end of the channel, the pin having a head end and a pin end and a length extending between the head end and the pin end;

the pin being slidably mounted along its length through an aperture in the housing such that the pin is slidably movable through the aperture between at least one unrestricted flow position and at least one restricted flow position; the head end of the pin extending outside the housing, and being readily connectable to and disconnectable from a pin reciprocating mechanism, the pin reciprocating mechanism being mounted outside the housing in line with the pin and controllably operable to move the pin between said at least one unrestricted flow position and said at least one restricted flow position, wherein the pin reciprocating mechanism has a slot for slidably receiving and retaining the head end within the slot, the pin reciprocating mechanism being readily detachably mounted outside the housing such that the head end is readily slidable into and out of the slot upon detachment of the pin reciprocating mechanism from the housing.

2. Apparatus for controlling plastic melt flow in an injection molding machine comprising:

a thermally conductive housing having a fluid flow channel sealably disposed in the housing, the channel having an input end sealably connected to a source of flow of a plastic melt material and an output end for controllably delivering the flow of plastic material to an input aperture of a mold cavity;

an elongated pin disposed within at least a portion of the channel for controlling output of the flow of plastic melt through the output end of the channel, the pin having a head end and a pin end and a length extending between the head end and the pin end;

the pin being slidably mounted along its length through an aperture in the housing such that the pin is slidably movable through the aperture between at least one unrestricted flow position and at least one restricted flow position; the head end of the pin extending outside the housing and being readily connectable to and disconnectable from a pin reciprocating mechanism, the pin reciprocating mechanism being mounted on the housing in line with the pin and controllably operable to move the pin between said at least one unrestricted flow position and said at least one restricted flow position, wherein the pin reciprocating mechanism comprises a piston mounted within a fluid sealed bore, the piston being controllably movable between a first and a second position within the sealed bore, the piston having or being interconnected to a pin mount having a slot for slidably receiving and retaining the pin head end.

3. The apparatus of claim 2 wherein the pin reciprocating mechanism is readily detachably mounted on the outside of the housing such that the pin head end is readily slidable into and out of the slot upon detachment.

4. Apparatus for controlling plastic melt flow in an injection molding machine comprising:

a thermally conductive housing having a fluid flow channel sealably disposed in the housing, the channel having an input end sealably connected to a source of flow of a plastic melt material and an output end for controllably delivering the flow of plastic material to an input aperture of a mold cavity;

an elongated pin disposed within at least a portion of the channel for controlling output of the flow of plastic melt through the output end of the channel, the pin having a head end and a pin end and a length extending between the head end and the pin end;

the pin being slidably mounted along its length through an aperture in the housing such that the pin is slidably movable through the aperture between at least one unrestricted flow position and at least one restricted flow position; the head end of the pin extending outside the housing and being readily connectable to and disconnectable from a pin reciprocating mechanism, the pin reciprocating mechanism being mounted outside the housing in line with the pin and controllably operable to move the pin between said at least one unrestricted flow position and said at least one restricted flow position;

wherein the pin reciprocating mechanism comprises a piston mounted with a fluid sealed bore, the piston being controllably movable between a first and a second position within the sealed bore, the piston having a stem portion extending outside the sealed bore or being interconnected to a pin mount disposed outside the sealed bore, wherein the stem portion or the pin mount includes a slot which slidably receives and retains the head end of the pin.

* * * * *